Figure 5:
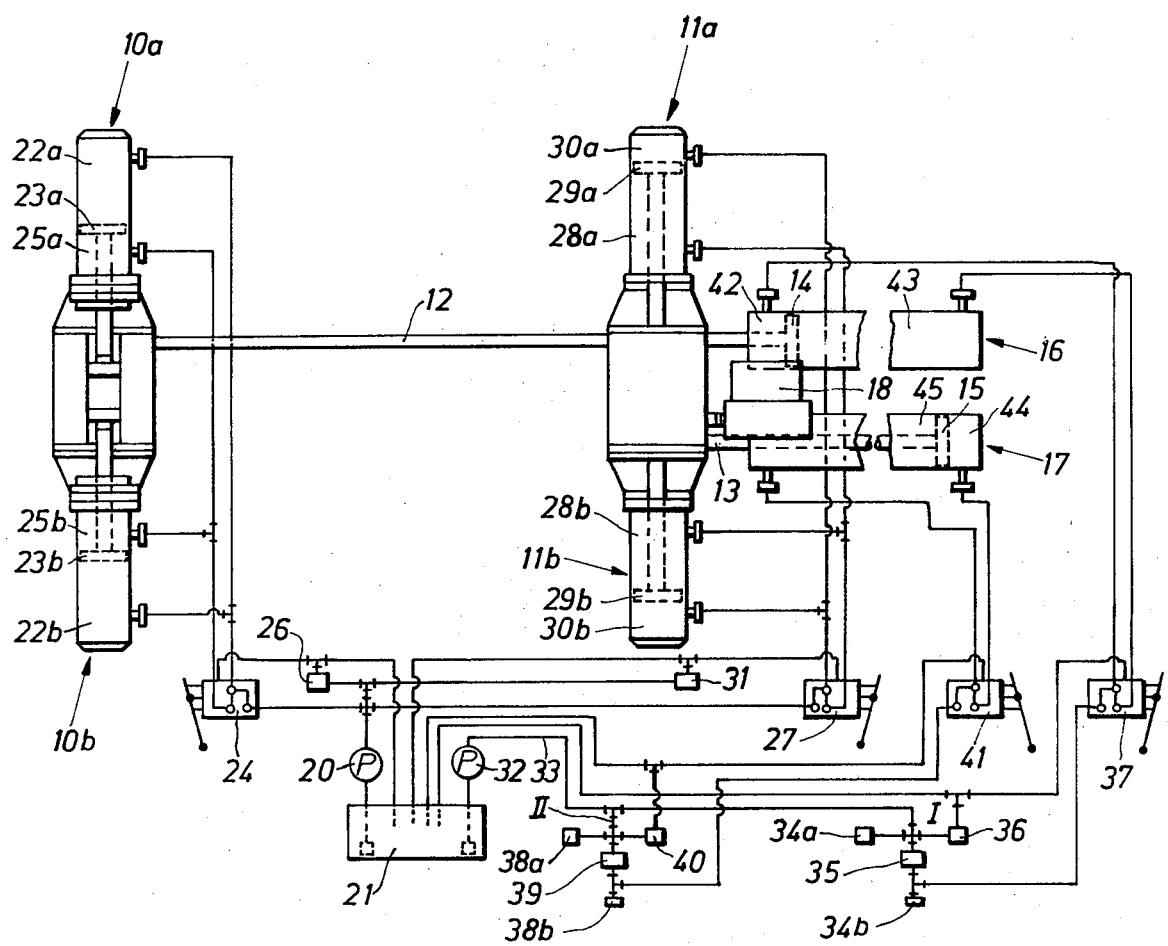

United States Patent

Damsky et al.

[15] 3,689,180
[45] Sept. 5, 1972

[54] APPARATUS FOR CONTINUOUSLY PRODUCING SHAPED ELEMENTS OF ACCURATE DIMENSIONS FROM SYNTHETIC PLASTICS MATERIALS

[72] Inventors: Walter Damsky; Siegfried Joisten, both of Krefeld; Johannes Otto Sajben, Krefeld-Gartenstadt, all of Germany

[73] Assignee: Farbenfabriken Bayer Aktiengesellschaft, Leverkusen, Germany

[22] Filed: Jan. 22, 1970

[21] Appl. No.: 4,961

[30] Foreign Application Priority Data

Feb. 7, 1969 Germany..........P 19 06 012.9

[52] U.S. Cl.................................425/161, 425/302
[51] Int. Cl. .................................................B29f 3/01
[58] Field of Search....18/12 T, 12 R, 12 TS; 22/115, 22/158, 162; 83/310, 311, 318, 1; 90/24 R, 24 C, 24 E

[56] References Cited

UNITED STATES PATENTS 3,454,693   7/1969   Crenshaw............18/12 R UX

FOREIGN PATENTS OR APPLICATIONS 909,093   10/1962   Great Britain.............18/5 BP Primary Examiner—J. Spencer Overholser
Assistant Examiner—Norman E. Lehrer
Attorney—Burgess, Dinklage & Sprung

[57] ABSTRACT

Shaped elements of accurate dimension are produced from synthetic plastics materials by pressing them through a shaping tool and are finished immediately after solidification by a cutting tool, wherein the cutting forces are kept remote from the forces which occur by the extrusion operation by means of a withdrawal mechanism.

1 Claim, 5 Drawing Figures

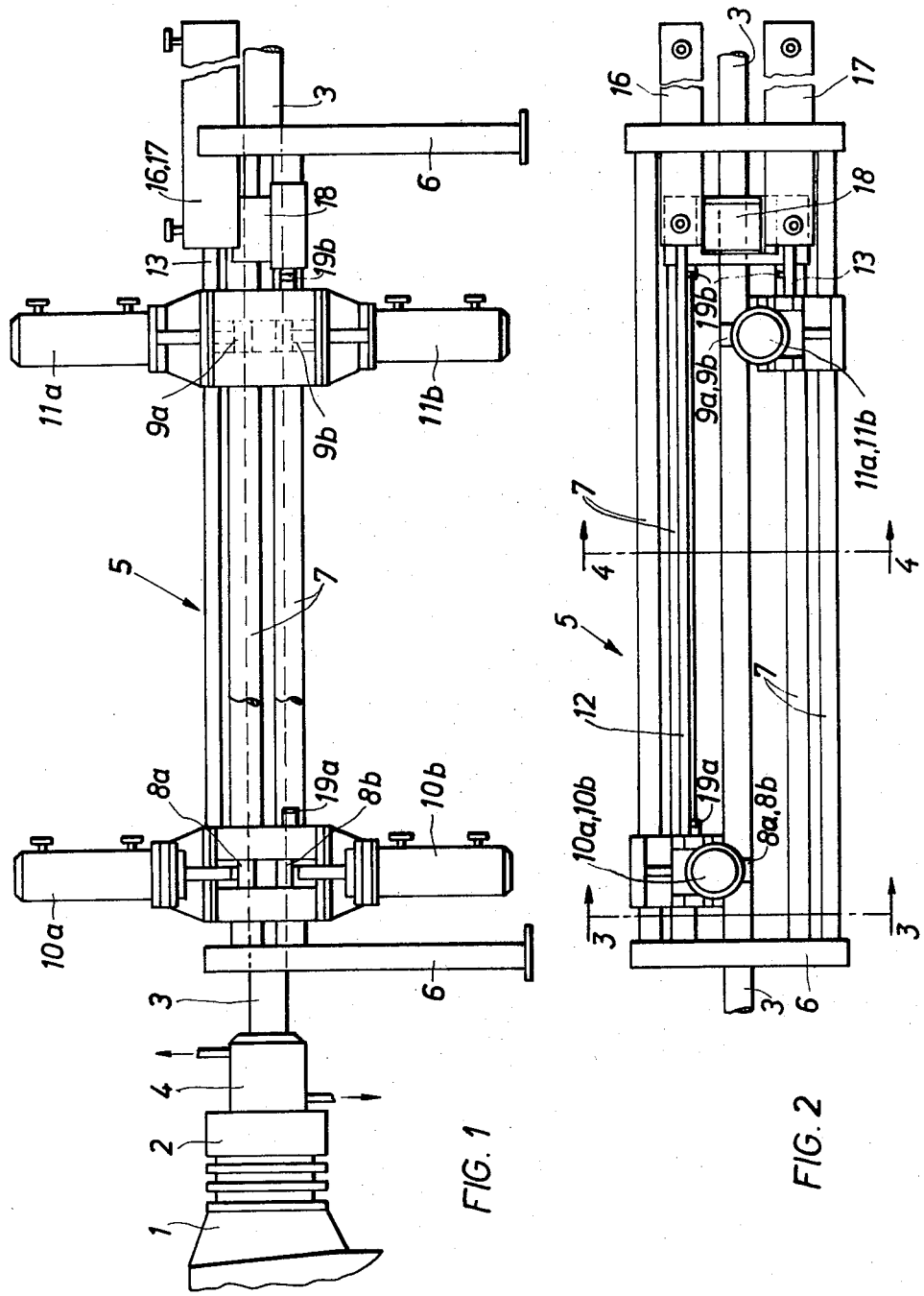

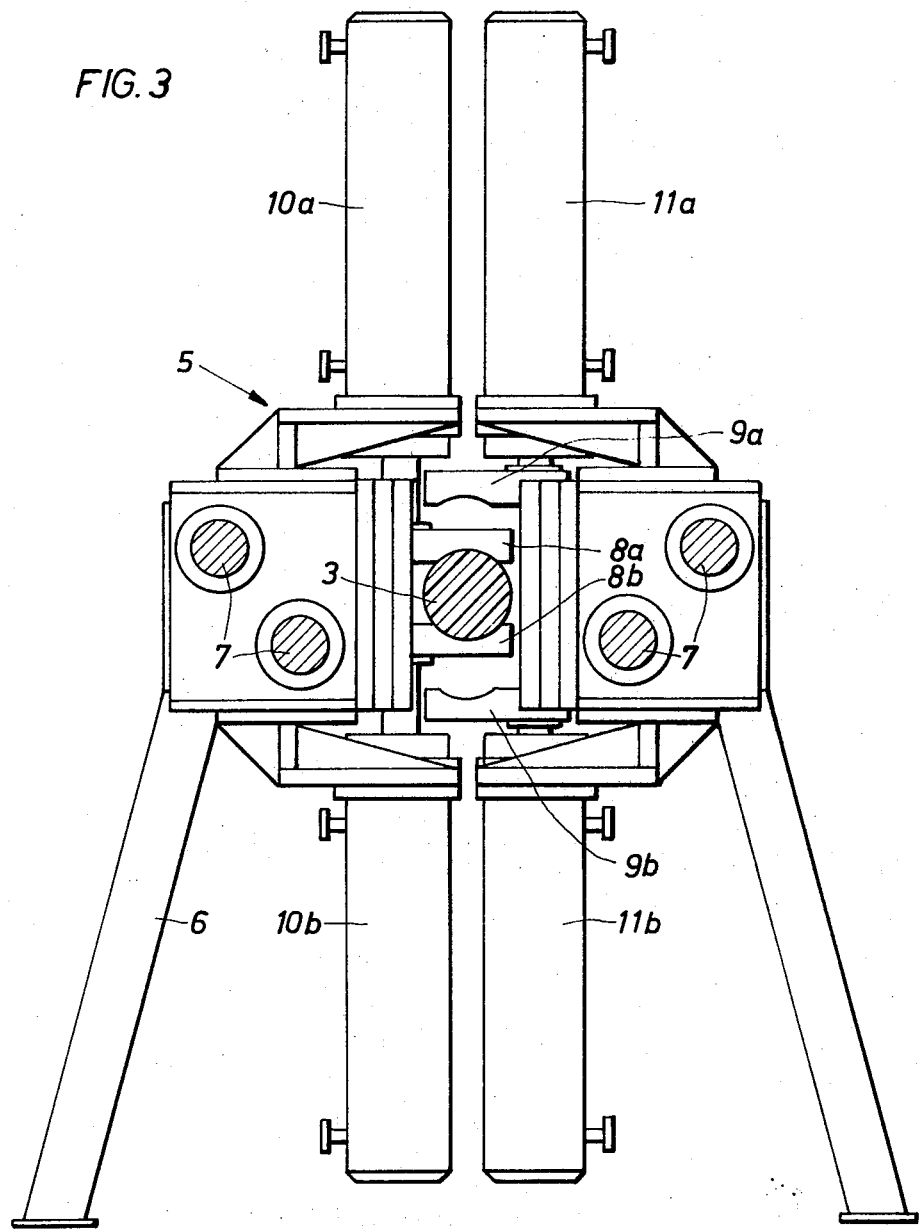

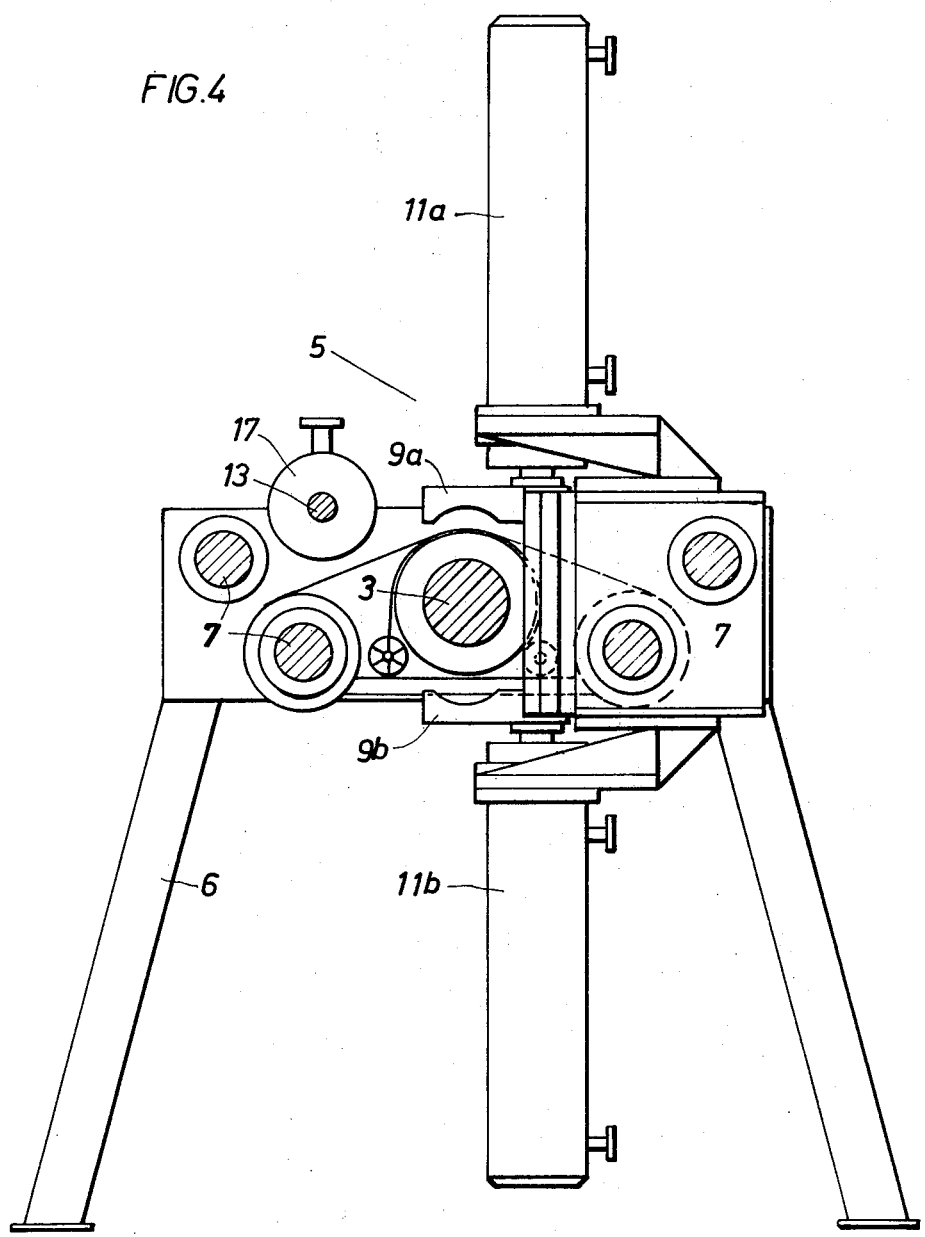

APPARATUS FOR CONTINUOUSLY PRODUCING SHAPED ELEMENTS OF ACCURATE DIMENSIONS FROM SYNTHETIC PLASTICS MATERIALS

The invention relates to a method of an apparatus for continuously producing shaped elements of accurate dimensions from thermoplastic synthetic plastics materials, e.g., from polyamide, acetal resin, polycarbonate or the like. The shaped elements are cast or extruded and then guided through a shaping tool (drawing die) which is largely oversize. Immediately after solidification, the elements are guided through a multi-step die cutting tool and are finished therein by machine cutting, according to our patent application Ser. No. 725,771, now U.S. Pat. No. 3,608,144.

An exceptional technical advance in the production of shaped elements of accurate dimensions from synthetic plastics materials is produced by this method according to the parent patent. By preshaping with a coarse tolerance, the shaped element is sufficiently oversized. Thus, although shrinkage or distortion occurs before the element enters the cutting tool, sufficient excess material is always present to cover fully all those surfaces of the shaped element which are to be machined during the subsequent cutting operation.

An important and hitherto unsolved problem is dealt with by the present invention, this being the withdrawal of the shaped elements from the extruder in such a way as to provide favorable conditions as regards the forces acting on the shaped element for the final cutting operation.

The simplest solution is to convey the shaped element by means of the extrusion pressure. This does not provide a satisfactory result, since distortions of the element occur between the shaping tool (drawing die) and cutting tool, owing to the counteracting pressure of the cutting tool. A satisfactory finishing by cutting is therefore not assured.

Furthermore, it is disadvantageous to use withdrawal mechanisms as known per se in conjunction with extruders which do not use finishing by cutting. By way of example, with roller type extractors, the contact surface between the rollers and the shaped element is extremely narrow, theoretically it is a line. In order to guarantee an adequate withdrawal force, high pressure forces are consequently necessary, and, because of the softness of the shaped element at the instant when it is necessary for the rollers to become operative, these forces can lead to permanent deformations. The use of the known caterpillar extractor belts would certainly produce smaller compressive forces on the shaped element. However, the space required, the technical expense and thus the low efficiency prohibit the use of this method for the proposed purpose.

It is an object of the present invention to provide a method and an apparatus by which it is possible to carry out a shaping by cutting of the extruded shaped element, in which allowance is made both for the extrusion forces acting on the shaped element and also the cutting forces which occur.

This object is achieved according to the present invention by the cutting forces, which are set up during the finishing by cutting, being kept remote from the forces which are set up during the continuous casting or extrusion operation.

The result thereby achieved is that distortions of the extruded shaped element, especially distortions between the shaping tool and cutting tool, cannot occur. The oversize or excess of the cross-sections of the shaped element which are necessary for the final machining operation can thereby be kept small. The efficiency of the finishing by cutting is thus considerably improved.

According to one proposed embodiment of the method, the extrusion and cutting forces are kept remote from one another by arranging for the cutting forces to be adapted to possible fluctuations in the extrusion forces by the fact that the forces are always mutually cancelled out. However, complicated measurement and control mechanisms are necessary for this purpose. In addition, errors in the machining of the surface of the shaped element can arise, as well as lack of homogeneity in the material of the shaped element.

The invention accordingly proposes another and substantially more simple solution, according to which the speed of withdrawal of the shaped element is kept constant, while the cutting speed is independent of the withdrawal speed. Thus, any desired cutting speed can be chosen in order to produce a surface of the required quality on the shaped element.

For carrying the method into effect, the basic apparatus is one which comprises a continuous casting machine or extruder (herein, "extrusion" is to be understood as including extrusion of a continuous piece using a ram, and also extrusion as in continuous casting, wherein no ram is used), with a succeeding shaping tool which is largely oversize and behind which is arranged a multi-step die cutting tool. In the present invention this apparatus is characterized in that the mul-ti!-step die cutting tool is mounted for movement backwards and forwards on guideways in a withdrawal or extraction mechanism which follows the continuous casting machine or extruder, the mechanism comprising at least two alternately operating pairs of clamping jaws, which are arranged between the shaping tool and the multi-step die cutting tool for movement backwards and forwards on guideways.

The use of clamping jaws has the advantage that the extraction mechanism is relatively small. The gripping elements of the clamping jaws are designed to conform to the shaped element which is to be manufactured and are fixed so as to be replaceable. A special advantage is that the gripper elements can within constructional limits, extend sufficiently far longitudinally of the shaped element that the surface pressure of the gripper elements is harmless to the shaped element.

The withdrawal mechanism of the apparatus according to the invention advantageously operates by hydraulic means, but can also operate by pneumatic, mechanical or even electromagnetic means. The withdrawal forces can be varied in just the same way as the speeds, in order to permit optimum operating conditions.

An embodiment of the apparatus according to the invention is shown diagrammatically in the accompanying drawing, and is more fully explained in association with the method according to the invention. In the drawings:

FIG. 1 shows the apparatus in side elevation,
FIG. 2 shows the apparatus in plan view,
FIG. 3 is a section on the line 3—3 of FIG. 2,
FIG. 4 is a section on the line 4—4 of FIG. 2, and FIG. 5 illustrates a constructional form which is a side elevation showing the hydraulic operation of the apparatus.

Material is melted in the extruder 1 and the shaped element is preshaped in the shaping tool 2, which is oversize to give rough tolerance, this allowing for shrinkage. The shaped element 3 solidifies in the succeeding cooling arrangement 4. The withdrawal device 5 consists of the frame 6, in which are mounted sliding guideways 7. Two pairs of clamping jaws 8a, 8b and 9a, 9b are adapted to be moved backwards and forwards on the guideways. The two pairs of clamping jaws 8a, 8b and 9a, 9b are of the same design; associated with each clamping jaw is a hydraulic arrangement 10a and 10b and 11a and 11b, respectively, with pistons and cylinders, by means of which the force required to close the jaws can be exerted hydraulically. The pairs of clamping jaws 8a, 8b and 9a, 9b are fixed on piston rods 12 and 13, respectively, which are parallel to the guides 7 and provided with pistons 14 and 15 guided in cylinders 16 and 17, respectively. By admission of pressure to both sides of the pistons 14 and 15, a differential pressure is produced, which is proportional to the withdrawal or braking force.

A cutting mechanism 18 is like-wise displaceably mounted on the sliding guideways 7. Coupling elements 19a and 19b arranged on the pairs of clamping jaws 8a, 8b and 9a, 9b respectively, serve for the coupling of the cutting mechanism 18.

Referring to FIG. 5, a pump 20 pumps oil from a sump 21 into outer pressure chambers 22a and 22b of the hydraulic systems 10a and 10b. The clamping jaws 8a and 8b are closed through pistons 23a and 23b, so that the element 3 is tightly gripped. The required closing pressure is maintained through a push-pull switch with a magnetic slider and limit switch 24. No oil is admitted to inner pressure chambers 25a and 25b. Oil flows back from the inner pressure chamber into the storage tank 21. A pressure-limiting valve 26 ensures that, when a certain predetermined pressure is reached additionally supplied oil is pumped in a cycle, i.e., it flows directly back into the sump 21. Immediately after the pair of clamping jaws 8a and 8b is closed, the pump 20 delivers oil through another push-pull switch with magnetic slider and limit switch 27. From there the oil flows into inner pressure chambers 28a and 28b of the hydraulic systems 11a and 11b, to open the clamping jaws 9a and 9b, by forcing the pistons 29a and 29b outwardly. In this way the oil is forced back from outer pressure chambers 30a and 30b into the sump 21. A pressure-limiting valve 31 is associated with the hydraulic system of this pair of clamping jaws 9a and 9b.

A pump 32 now delivers liquid under pressure through another hydraulic system 33, to a pipe section I associated with a pressure transmitter 34a and 34b, a flow regulator 35 and a pressure-limiting valve 36. A push-pull switch 37 with a magnetic slider and limit switch is connected to the pipe section I and is associated with the push-pull cylinder 16. The pipe section 11 associated with the push-pull cylinder 17 is similarly equipped with pressure-transmitters 38a and 38b a flow regulator 39, a pressure-limiting valve 40 and a push-pull switch with magnetic slider and limit switch 41. The pump 32 delivers liquid simultaneously into the two pipe sections I and II. Pressurized liquid admitted to the pressure chamber 42 on the left of the piston 14 through the pipe section 1. The rate of admission is kept constant, whereby withdrawal speed is also kept constant. The pair of clamping jaws 8a and 8b which extracts the shaped element 3, is moved in the operating direction by means of the piston rod 12. A counteracting pressure is always maintained at this time in the right-hand pressure chamber 43. In this way, a braking effect can also be exerted on the shaped element 3.

Pressure is simultaneously admitted through the pipe section II to a right-hand pressure chamber 44 of the push-pull cylinder 17, while a left-hand pressure chamber 45 drains into the sump 21. The pair of clamping jaws 9a and 9b is displaced towards the extruder 1, by means of the piston 15 and the piston rod 13. The coupled cutting mechanism 18 is also moved at the same time. The two pairs of clamping jaws 8a and 8b and 9a, 9b are thus moved in opposite directions to one another. Since the clamping jaws 9a and 9b are wide open, they travel over the clamping jaws 8a and 8b. The cutting mechanism 18 is uncoupled at this instant and is carried back by the pair of clamping jaws 8a and 8b. The entire procedure is then repeated, the functions of the pairs of clamping jaws being interchanged as compared with the foregoing explanation.

It is to be understood that the pair of clamping jaws which are guiding the cutting mechanism 18 at any time can be displaced at a greater velocity that the other pair or jaws. It is also possible for several cutting strokes to be carried out, while the other pair of clamping jaws is extracting the shaped element.

In order to be entirely independent as regards the cutting speed, the cutting mechanism 18 can also be provided with its own movement mechanism.

The withdrawal arrangements can also be operated without a cutting tool, merely for the purpose of extracting the shaped element. In this case, the withdrawal speed can with advantage be adjusted as a function of the pressure difference between the pressure behind the extruder nozzle and the withdrawal or braking pressure. In this case the withdrawal speed is automatically regulated.

We claim:

1. An apparatus for producing an extruded article having a precision cross-section profile, comprising in combination a. an extruder having a die section from which extrusion issues, said die section being sized to impart to the extrusion a predetermined cross sectional profile greater than the ultimately desired, b. a multi-step die cutting tool disposed in the path of extrusion issuing from the die section, to receive the extrusion and being sized to cut down the oversize profile to a reduced cross-sectional profile to the desired precision profile, c. guiding means operatively interposed between the extruder and cutting tool for clamping the extrusion and guiding the extrusion over the path thereof through the cutting tool and supporting the extrusion for the cutting by the cutting tool, d. said guiding means comprising two pairs of alternately working clamping jaws, means for reciprocating each pair between a working stroke during which the clamping jaws clamp the extrusion and guide it over said path and a return stroke during which the clamping jaws are open and are returned to the position of commencement of the working stroke, and e. coupling means combined with each pair of clamping jaws for releasably securing the cutting tool to the clamping jaws for carrying of the cutting tool by the clamping jaws during the return stroke of the clamping jaws for cutting of the extrusion by the cutting tool during said carrying thereof.

* * * * *